(12) United States Patent
Junker (10) Patent No.: US 9,475,121 B2
(45) Date of Patent: Oct. 25, 2016

(54) MACHINE AND METHOD FOR TURNING AT LEAST FLAT SHOULDERS ON A CRANKSHAFT THAT SURROUND CRANKPINS

(71) Applicant: Erwin Junker Maschinenfabrik GmbH, Nordrach (DE)

(72) Inventor: Erwin Junker, Buehl (DE)

(73) Assignee: Erwin Junker Maschinenfabrik GmbH, Nordach (DE)

( * ) Notice: Subject to any disclaimer, the term of this patent is extended or adjusted under 35 U.S.C. 154(b) by 197 days.

(21) Appl. No.: 14/366,122

(22) PCT Filed: Dec. 18, 2012

(86) PCT No.: PCT/EP2012/075974
§ 371 (c)(1),
(2) Date: Jun. 17, 2014

(87) PCT Pub. No.: WO2013/092599
PCT Pub. Date: Jun. 27, 2013

(65) Prior Publication Data
US 2014/0325838 A1    Nov. 6, 2014

(30) Foreign Application Priority Data
Dec. 22, 2011  (DE) .................. 10 2011 089 654

(51) Int. Cl.
*B23B 5/18*   (2006.01)
*B23P 15/00*  (2006.01)

(52) U.S. Cl.
CPC ............ *B23B 5/18* (2013.01); *B23P 15/003* (2013.01); *B23B 2215/20* (2013.01);
(Continued)

(58) Field of Classification Search
CPC . Y10T 29/17; Y10T 29/49286; Y10T 82/19; Y10T 29/5109; Y10T 29/5114; B23B 5/18; B23B 5/36; B23B 2265/12; B23B 2205/08; B23B 2215/20; B26D 5/14; B26D 5/16; B23P 2700/07
See application file for complete search history.

(56) References Cited

U.S. PATENT DOCUMENTS

| 1,488,547 A | 4/1924 | Melling |
| 3,793,687 A * | 2/1974 | Berbalk .................. B23B 5/18 |
| | | 29/558 |

(Continued)

FOREIGN PATENT DOCUMENTS

| DE | 196 09 239 A1 | 9/1997 |
| DE | 10 2011 076809 A1 | 11/2012 |

OTHER PUBLICATIONS

International Search Report and Written Opinion for Application No. PCT/EP2012/075974, dated Apr. 15, 2013.
(Continued)

*Primary Examiner* — Jason L Vaughan
(74) *Attorney, Agent, or Firm* — Marshall, Gerstein & Borun LLP (57) ABSTRACT

A crankshaft including narrow flat shoulders that are located next to a bearing pin at adjacent cheeks of the crankshaft. The narrow flat shoulders are machined by turning a rotary tool. In the process, the crankshaft that is clamped in a fixed manner and rotates about a rotation and clamping axis in which also the centric longitudinal axis formed by centric bearing pins of the crank shaft is located. As a result, the bearing pins rotate with a geometric axis thereof on a circular path about the rotation and clamping axis. The rotary tool tracks the moving bearing pins with regard to the vertical and lateral movement thereof in two movement directions that are perpendicular to each other. As a result, the rotary tool is in consistent lateral engagement with the flat shoulder of the bearing pin.

3 Claims, 6 Drawing Sheets

(52) U.S. Cl.
CPC ....... *B23B 2270/22* (2013.01); *B23P 2700/07* (2013.01); *Y10T 29/49286* (2015.01); *Y10T 82/10* (2015.01); *Y10T 82/19* (2015.01)

(56) References Cited

U.S. PATENT DOCUMENTS

| | | | |
|---|---|---|---|
| 3,880,025 A | 4/1975 | Kralowetz et al. | |
| 3,948,076 A * | 4/1976 | Eitel | B21D 3/10 29/6.01 |
| 4,206,393 A * | 6/1980 | Chiba | G05B 19/4163 29/6.01 |
| 4,269,551 A * | 5/1981 | Kralowetz | B23C 3/06 29/888.08 |
| 5,765,270 A | 6/1998 | Schrod et al. | |
| 6,026,549 A * | 2/2000 | Makino | B23Q 1/5468 29/27 R |
| 6,038,489 A * | 3/2000 | Pickles | G05B 19/184 29/888.08 |
| 6,146,063 A * | 11/2000 | Ramold | B23C 3/06 407/113 |
| 6,233,810 B1 * | 5/2001 | Asbeck | B23C 3/06 29/33 P |
| 6,684,500 B1 * | 2/2004 | Kohlhase | B23B 5/18 29/558 |
| 7,065,848 B2 * | 6/2006 | Robotta | B23B 5/18 29/27 C |
| 7,424,776 B2 * | 9/2008 | Shoji | B23B 5/18 279/106 |
| 7,507,147 B2 * | 3/2009 | Reim | B24B 5/42 29/888.08 |
| 7,827,684 B2 * | 11/2010 | Heimann | B21H 7/185 29/888.01 |
| 8,011,096 B2 * | 9/2011 | Reeb | B21H 7/185 29/446 |
| 2003/0150302 A1 | 8/2003 | Shimomura | |
| 2014/0109364 A1 * | 4/2014 | Junker | B23B 5/18 29/6.01 |
| 2014/0223707 A1 * | 8/2014 | Schreiber | B23D 37/005 29/6.01 |
| 2014/0223708 A1 * | 8/2014 | Schreiber | B23P 23/04 29/6.01 |

OTHER PUBLICATIONS

International Preliminary Report on Patentability for Application No. PCT/EP2012/075974, dated Mar. 31, 2014.

* cited by examiner

MACHINE AND METHOD FOR TURNING AT LEAST FLAT SHOULDERS ON A CRANKSHAFT THAT SURROUND CRANKPINS

CROSS-REFERENCE TO RELATED APPLICATIONS

This is the U.S. National Stage of International Patent Application No. PCT/EP2012/075974, which has an international filing date of Dec. 18, 2012, and claims priority benefit of German patent application No. 10 2011 089 654.6, filed Dec. 22, 2011. The entire contents of each of the foregoing are hereby incorporated herein by reference.

BACKGROUND

The present disclosure starts from a method described in the earlier German Patent Application 10 2011 076 809.2 for the complete machining of unmachined journals/pins and flat shoulders of forged or cast blanks for a crankshaft. According to this earlier proposal, the machining of the crankshaft starting from the blanks 10 was improved by a novel distribution of the processes of turning, rough grinding and fine grinding between the individual regions of the crankshaft. More specifically, the procedure was as follows:

a) the flat shoulders associated with the central bearing journals are machined first of all by turning, b) the central bearing journals and the crankpins are then rough-ground, the former without the flat shoulders thereof and the latter with the flat shoulders thereof and, finally, c) after this, the central journals and the crankpins are finish-ground to the final size.

Among the resulting advantages are that an oversize remaining after step b is smaller than an oversize required for conventional finish-grinding of journals/pins and flat shoulders. Subsequent finish-grinding is therefore accomplished more quickly and with less wear on the grinding disks than in the conventional procedure, according to which the flat shoulders on the central bearing journals must always be rough-ground.

According to the earlier German Patent Application 10 2011 076 809.2, it had already been recognized that the hitherto conventional rough grinding involved in the machining of the large flat shoulders on the central bearing journals could be replaced by a turning process. On the other hand, the opinion was that rough grinding would have to be retained for the machining of the flat shoulders laterally surrounding the crankpins and situated on the webs of the crankshaft. In this context, it was expressly explained how difficult it would be to create a turning machine by means of which a crankshaft region that moved eccentrically during the rotation of said crankshaft could be machined economically and accurately by turning. Moreover, the flat shoulders on the crankpins are significantly smaller than the flat shoulders on the central bearing journals. The conventional procedure of rough-grinding the flat shoulders of the crankpins using the broad sides of the grinding disks, by means of which the crankpins themselves and, if appropriate, the undercuts were also machined, was therefore retained.

GENERAL DESCRIPTION

In the meantime, the desire has arisen to further improve the method proposed in the earlier application and the associated production line. It is therefore the underlying object of the present disclosure to provide a method for turning and a turning machine, by means of which the flat shoulders surrounding the crankpins on the webs of a crankshaft are machined economically and with great accuracy by turning. This aim relates primarily to the machining of unmachined flat crankpin shoulders on the cast or forged crankshaft blanks, but is not limited thereto.

The method according to the present disclosure is based on a clear principle and is the precondition for a turning machine which is of mechanically simple construction and is reliable. During the turning process, the crankshaft remains in one place and merely performs a rotation about its central longitudinal axis, which is defined by the central bearing journals. In contrast, the turning tool is moved in three linear and mutually perpendicular directions of motion, that is to say on three axes of motion. Of these, the first direction of motion runs parallel to the longitudinal axis of the crankshaft. Hence, the target location is primarily a gap between two adjacent webs between which there is a crankpin. The turning tool is therefore fed into at least one selected flat shoulder, with the cutting depth of the turning tool also being set. The second direction of motion, which is perpendicular to the first, serves to hold the major cutting edge of the turning tool in engagement with the flat shoulder; the turning tool must therefore constantly follow the flat shoulder in the horizontal direction. The third direction of motion, which is vertical in accordance with the preconditions, keeps the turning tool at the same level as the geometrical axis of the crankpin in all rotational positions of the crankshaft—and hence also in all of the continuously changing positions of the crankpin. During the turning process, the turning tool must therefore be moved continuously in the second and third directions of motion, wherein the movements in these two directions must be precisely controlled and matched to one another. As a result, the turning tool has to be continuously adjusted to the level of the crankpin by means of the third direction of motion, which is a cyclical up and down motion. The motion in the second direction of motion is a cyclical backward and forward motion and has the effect that the turning tool remains continuously in engagement with the flat shoulder, with the major cutting edge being at the level of the geometrical axis of the crankpin.

By analogy with the known process of oscillating stroke grinding, the above-explained machining method according to the present disclosure can also be referred to as "oscillating stroke turning". In the motion sequence, the method according to the present disclosure has the advantage that the situation of engagement is always the same: the turning tool is always constantly in front of the center plane of the crankpin with the major cutting edge horizontal. During oscillating stroke grinding, on the other hand, the grinding disk does admittedly only have to be moved backward and forward in a linear manner in a horizontal direction, but the region of engagement between the grinding disk and the webs on the crankpin changes level continuously; this causes difficulties in the supply of liquid grinding medium. In other ways too, "oscillating stroke turning" has advantages in comparison with oscillating stroke grinding because the turning tool is relatively simple and the crankshaft can be turned more quickly than is the case with grinding. Another major advantage is obtained in tooling costs, which can be kept lower if indexable inserts are used.

An advantageous development of the method according to the present disclosure consists in that work is carried out with a turning tool which has major cutting edges on both sides. As it is introduced into the gap between two adjacent webs, the two flat shoulders of a crankpin are therefore machined simultaneously. The economy of the method according to the present disclosure is thereby further increased.

It is furthermore advantageous if, according to another embodiment of the method, a turning tool which is also provided with major cutting edges on the end is used for turning the flat shoulders. The major cutting edge on the end is then designed in such a way that an undercut is thereby generated after the turning of the flat shoulders. Here too, it is possible to simultaneously produce two undercuts on both sides of the crankpin.

By way of example, the method according to the invention can be carried out by performing the drive for the controlled second and third directions of motion by means of positioning motors via recirculating ball spindles. These are tried and tested devices which operate precisely and reliably. According to a particularly advantageous embodiment, however, provision is made for the drives for the second and third directions of motion to be performed by respective crank mechanisms. This is a tried and tested drive element, which likewise operates reliably and without backlash. In principle, each of the crank mechanisms consists of an eccentric disk, on which there is arranged, by means of a connecting rod journal, a connecting rod, which exerts a driving action on one of the components to be moved in linear fashion, namely the intermediate slide or the tool slide. In comparison with the likewise possible drives by means of recirculating ball spindles, the crank mechanism has the very specific advantage here, based on its kinematics, that speed adaptation takes place at the points of reversal of the linear motion. As the point of reversal is approached, the speed of the linear motion is reduced and, once the point of reversal is traversed, it is increased again gradually. A smooth, harmonious linear motion is thus obtained for the intermediate slide and the tool slide without the need for special outlay on control to achieve it. The speed of rotation of the crank mechanism can furthermore be adapted in terms of angular speed within one revolution.

The method according to the present disclosure can be used to advantage in the initially described method according to the earlier German Patent Application 10 2011 076 809.2. When the unmachined crankshaft is clamped for rotation with its central longitudinal axis, the flat shoulders of the crankpins can be turned just as well by means of the method according to the present disclosure as they were rough-ground with the previously known method. The method known from the earlier application is then modified in such a way that the flat shoulders associated with the crankpins are now also turned at the beginning of the method before or after the flat shoulders which are associated with the central bearing journals. The advantages that were already claimed in the earlier application are thereby further increased: namely, the wear on the grinding disks which were previously used in the rough grinding of the crankpins and which also have to rough-grind the flat shoulders with their broad sides is reduced. Further advantages arise from the fact that it is possible to start from a smaller oversize than hitherto when finish-grinding to the final size.

Since the details of the turning machine according to the present disclosure are based on the crankshaft being clamped in its longitudinal direction and being driven to rotate in the longitudinal direction, it is also possible to implement multiple arrangements of the kind which are familiar on grinding machines and which allow the setting up of production lines. For example, two turning tools can be provided at a distance from one another on the tool slide of a crankshaft turning machine according to the present disclosure; in this case, the flat shoulders of two crankpins which have the same positioning angle on the crankshaft can also be machined simultaneously. Particularly advantageous is a multiple arrangement in which at least two turning units with a common rotary driving and clamping device are assembled. In this case, each turning unit comprises a main slide, an intermediate slide, a first and a second crank mechanism and a tool 5 carrier. The turning units form independently controllable drive units for respective turning tools. In this arrangement, flat shoulders of crankpin bearings which have a different positioning angle on the crankshaft can be machined simultaneously. It thus 10 becomes possible to construct economical production lines in many different versions.

BRIEF DESCRIPTION OF THE DRAWINGS

The present disclosure is explained in greater detail below by means of illustrative embodiments, which are shown in the figures. The drawings show the following.

DETAILED DESCRIPTION OF THE DRAWINGS

Figure 1:
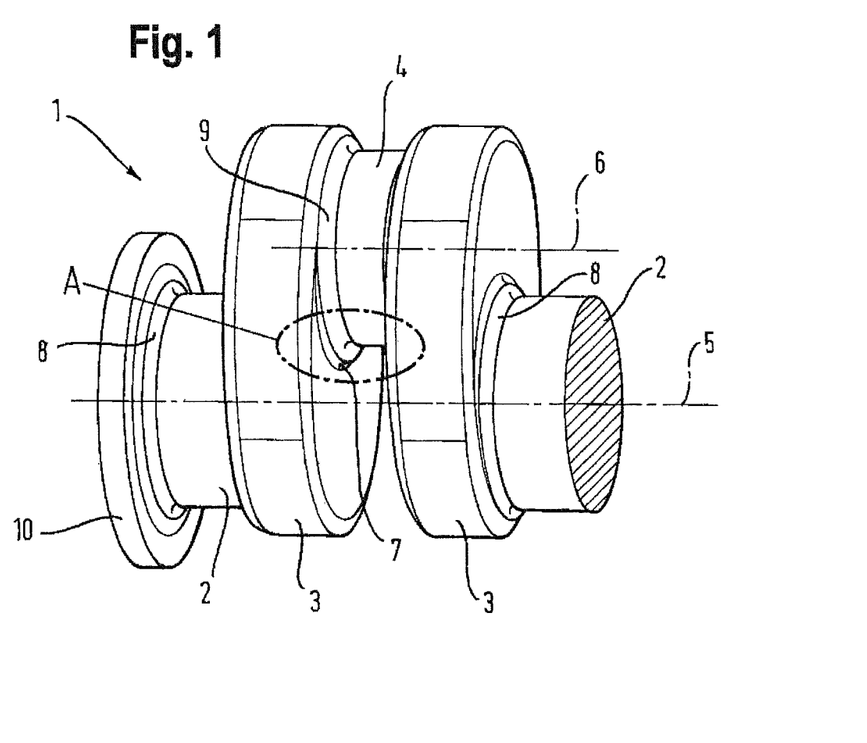
FIG. 1 is a segment of a crankshaft on which turning work is to be performed.

FIG. 1 shows a segment of a crankshaft 1. Two central bearing journals 2 with their associated webs 3, between which laterally and axially there is a crankpin 4, are illustrated. The bearing journals 2 have the common central longitudinal axis 5, about which the crankshaft 1 rotates in operation, and the crankpin 4 has the geometrical axis 6. A flange 10, which merges via a flat shoulder 8 into the bearing journal 2, is provided adjacent to the left-hand bearing journal 2. In a similar way, the flat shoulders 9 are situated between the crankpin 4 and the adjacent webs 3 thereof. These form as it were a pedestal on the remaining mutually facing side faces of the webs. An annular rounded step 7 of the flat shoulder 9, which merge into the circumferential contour of the web 3 in the upper region thereof, can therefore be seen in the lower region of this side face, said region being visible in FIG. 1.

Figure 2:
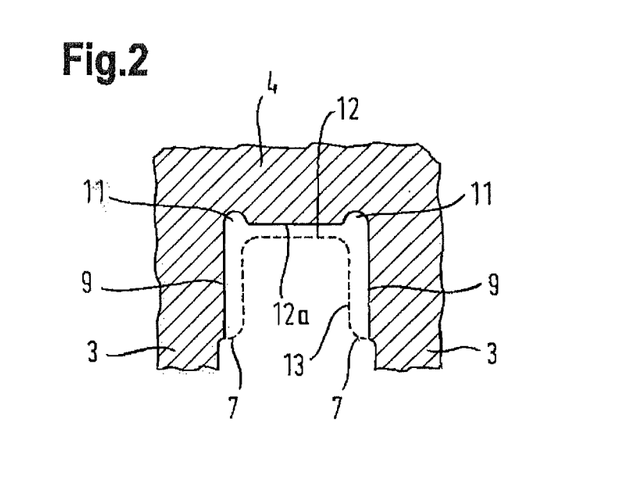
FIG. 2 shows a sectional representation in the region of detail A from FIG. 1.

FIG. 2 further illustrates the design of the flat shoulder 9 in the region of the crankpin 4. In this case, a partial section passing through the geometrical axis 6 of the crankpin 4 is shown, passing through the edge contour of the crankpin 4 with its adjacent webs 3 approximately in the region of detail A in FIG. 1. The area which is shown hatched in FIG. 2 corresponds to the contour after turning. It makes a transition from the flat contour of the flat shoulders 9 on both sides via undercuts 11 to a cylindrical circumferential contour 12, which is machined further by grinding to the final bearing surface 12a after turning. The rough contour 13 which the crankpin 4 and the flat shoulders 9 have before turning is depicted by a dashed line in FIG. 2. The present disclosure is concerned with reaching the turned contour by turning the rough contour 13, the turned contour being bounded by the turned flat shoulders 9 in FIG. 2 and also, in a special embodiment, by the undercuts 11.

Figure 3:
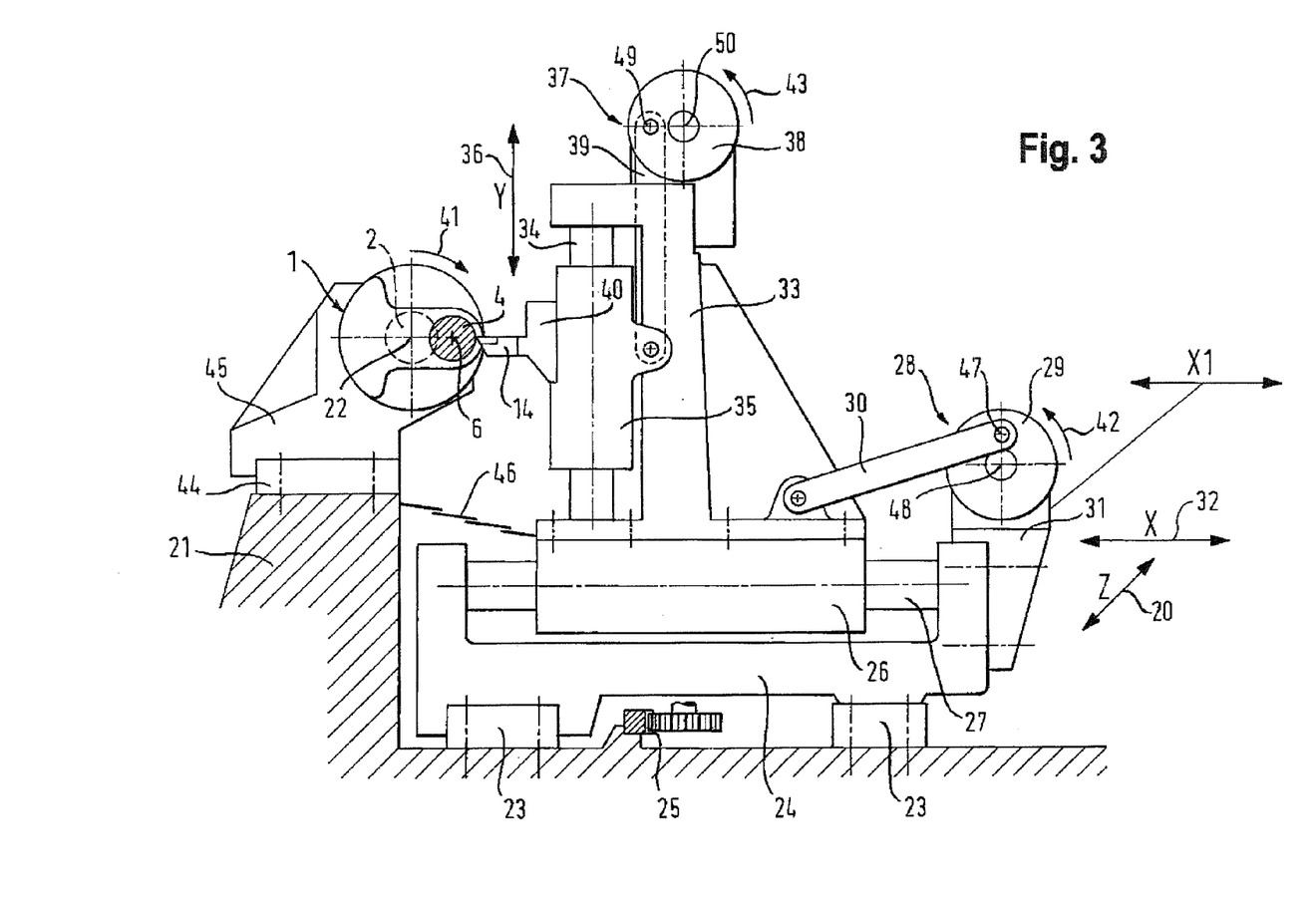
FIG. 3 shows a longitudinal section through a crankshaft turning machine by means of which the method according to the present disclosure can be carried out.

A crankshaft turning machine suitable for this purpose is illustrated in a longitudinal section in FIG. 3. The geometrical line of origin for describing the machine is the rotation and clamping axis 22, which is perpendicular to the plane of the drawing in FIG. 1. This axis is fixed by a rotary driving and clamping device, which is not shown in FIG. 1 and can consist in the normal way of a workpiece headstock and of a tailstock. The rotation and clamping axis 22 is normally horizontal; when the crankshaft 1 is clamped, it is identical with the central longitudinal axis 5 thereof. On horizontal running rails 23, the likewise horizontally aligned machine bed 21 carries a main slide 24, which in operation is moved horizontally and parallel to the rotation and clamping axis 22. This direction is denoted by 20; according to the usual practice in machine tool engineering, this is the Z axis. Accordingly, it is perpendicular to the plane of the drawing in FIG. 1 and is recalled by an oblique arrow. The main slide 24 can be moved backward and forward by a rack drive 25, for example.

A slideway 27, which extends horizontally and perpendicularly to the rotation and clamping axis 22 and on which an intermediate slide 26 is driven and slides in a controlled manner, is mounted on the main slide 24. Its direction of movement is indicated by the double direction arrow 32, that is to say the X direction according to those in the industry. The intermediate slide 26 is driven by a first crank mechanism 28, which is supported on the main slide 24 via a base part 31. The first crank mechanism 28 consists of a motor-driven eccentric disk 29 and of a connecting rod 30 pivotally attached thereto, which, for its part, is pivotally attached to the intermediate slide 26. The connecting rod 30 is pivotally attached to the eccentric disk 29 by a connecting rod journal 47. Since the connecting rod journal 47 is attached in a radially adjustable manner to the eccentric disk 29, the working stroke of the intermediate slide 26 can be increased or reduced in a simple manner.

The intermediate slide 26 furthermore carries an upward-extending stand 33, on which a tool slide 35 is driven and slides in a controlled manner via a vertical slideway 34. Its direction of movement is indicated by the double direction arrow 36 (corresponding to the Y axis). The tool slide 35 is driven by a second crank mechanism 37, which once again consists of a drive motor, an eccentric disk 38 and a connecting rod 39, which is pivotally attached thereto by means of a connecting rod journal 49 and, for its part, is pivotally attached to the tool slide 35. The working stroke of the tool slide 35 can also be increased or reduced by radial adjustment of the connecting rod journal 49 on the eccentric disk 38. The turning tool 14 is clamped on the tool slide 35 and, in FIG. 1, is already aligned with the crankpin 4 of a clamped crankshaft 1.

Laterally, adjacent to the main slide 24, the machine bed 21 carries a work table 44, which carries the base part 45 of the rotary driving and clamping device already mentioned. In the illustrative embodiment described, the rotation and clamping axis 22 is fixed in operation; that is to say that, in rotary operation, the clamped crankshaft 1 undergoes only a rotary motion but no linear motion. However, this does not exclude the possibility, in the case of a rotary driving and clamping device comprising a workpiece headstock and a tailstock, of these units being moved in a linear manner on the base part 45 in the direction of the rotation and clamping axis 22, as is required for the clamping of the crankshafts 1 and for adaptation to different crankshaft lengths. All that part of the turning machine which lies to the right of the rotary driving and clamping device in FIG. 3 is a complete self-contained constructional unit, which is used exclusively for the controlled movement of the turning tool 14. This constructional unit can also be referred to as a turning unit, and a plurality of turning units can be associated with a single rotary driving and clamping device, for example; cf FIG. 6. As it were on the boundary between the two subassemblies, a cover 46 is provided in order to ensure that no chips reach the horizontal slideway 27.

Figure 4:
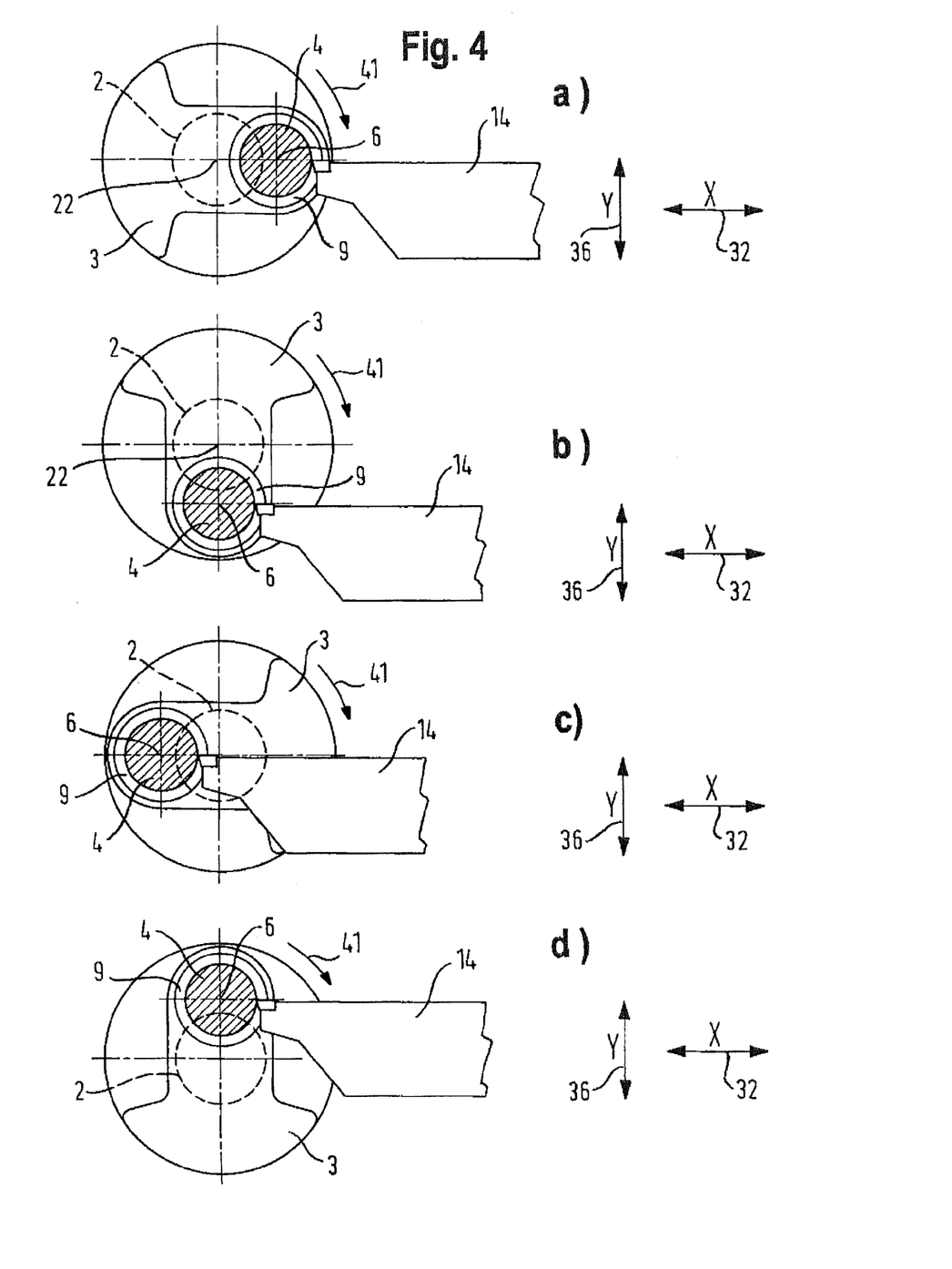
FIG. 4 illustrates various phases of motion during the interaction of the turning tool with the crankshaft.

The crankshaft turning machine described above operates as follows: by moving the main slide 24 on the running rails 23, the tool carrier 40 is moved with a particular turning tool 14 in front of the gap between two webs 3, at which the flat shoulders 9 are to be machined. The crankshaft 1, which is clamped at the central bearing journals 2 thereof, is made to rotate by the rotary driving and clamping device, as a result of which the crankshaft 1 rotates centrically around the rotation and clamping axis 22, cf direction arrow 41. As a result, the crankpin 4 moves on a circular path around the rotation and clamping axis 22. The second crank mechanism 37 then comes into action, wherein the eccentric disk 38 rotates about the axis of rotation 50 thereof (cf direction arrow 43) and moves the tool carrier 40 with the turning tool 14 up and down in a vertical direction 36. During this process, the linear motion of the turning tool 14 must be matched to the orbiting motion of the crankpin 4 in such a way that the major cutting edge of the turning tool 14 is at the level of the geometrical axis 6 of the crankpin 4. The turning tool 14 is continuously made to track the crankpin 4 vertically. This process is illustrated clearly in FIG. 4 using the example of four selected positions a to d.

However, the cutting tool 14 is intended to cut laterally into the flat shoulder 9 of one or both webs 3 by means of its major cutting edge. A horizontal motion (direction arrow 32) is therefore also required simultaneously with the vertical motion (direction arrow 36). This is supplied by means of the first crank mechanism 28, which moves the intermediate slide 26 and hence also the stand 33 backward and forward in the horizontal direction of movement 32 as its eccentric disk 29 rotates about the axis of rotation 50 thereof (cf direction of rotation 42). The cutting tool 14 is thus also made to track the crankpin 4 continuously in a horizontal direction. This process is likewise clearly illustrated by FIG. 4. The horizontal tracking motion must additionally have superimposed upon it the working stroke of the cutting tool 14, which extends over the radial extent at least of the flat shoulder 9 and possibly also of the undercuts 11.

All the motion processes described must take place simultaneously and in a manner continuously matched to one another. For this purpose, use is made of a CNC controller which takes into account all the relevant position parameters. The embodiment described having the first crank mechanism 28 and the second crank mechanism 37 has the advantage that the linear speed of adjustment of the intermediate slide 26 and of the tool slide 35 decreases as the point of reversal is approached and likewise increases again with increasing distance from the point of reversal. This meets the requirement for smooth operation that takes place with a matched speed in a completely automatic way.

Figure 5:
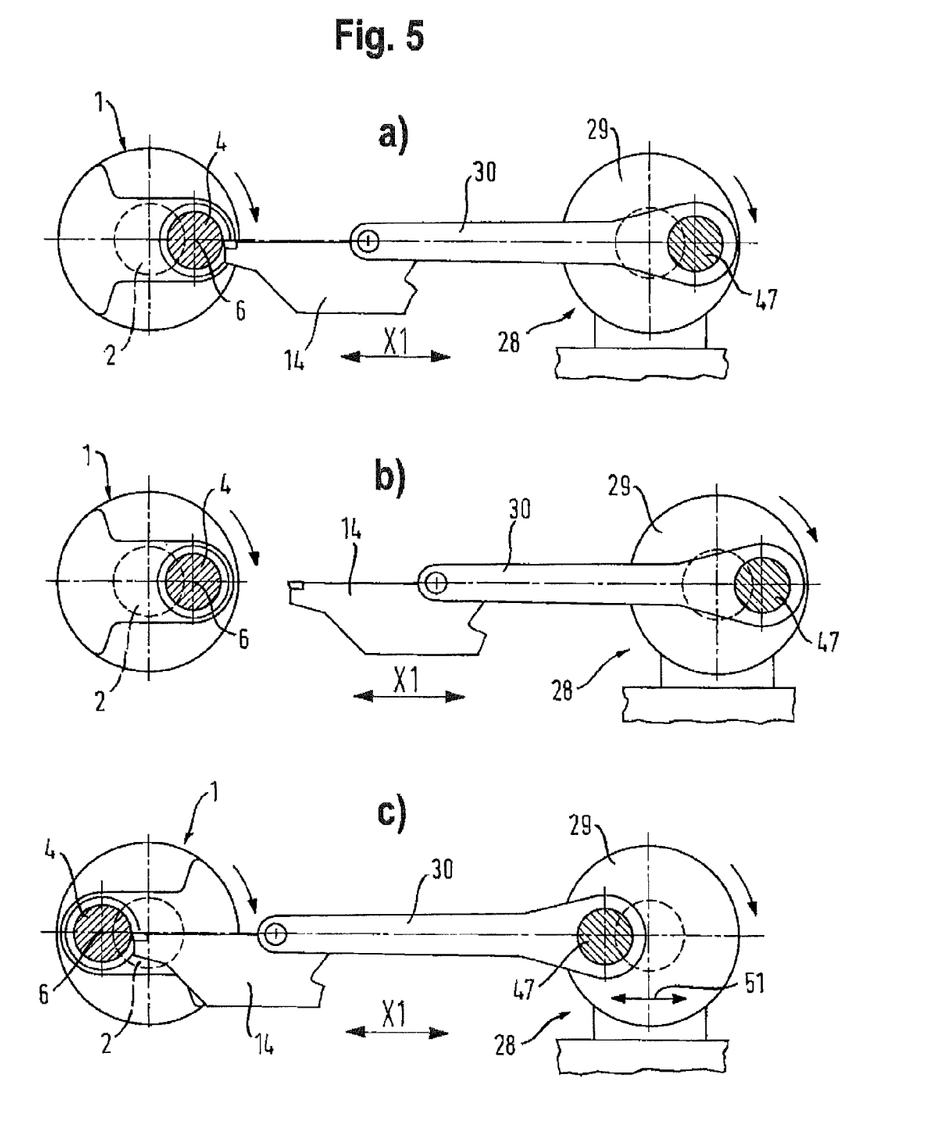
FIGS. 5*a* to 5*c* show various ways of performing different settings on the crankshaft turning machine according to FIG. 3.

FIGS. 5a to 5b illustrate in a schematic representation the possibilities of adjustment between a crank mechanism 28 and the crankshaft 1, wherein the first crank mechanism 28 is shown, said mechanism bringing about the second, horizontal direction of motion 32 along the X1 axis. The same possibilities of adjustment can also be available for the second crank mechanism 37 but are not absolutely essential. These movements then serve to adjust the stroke of the turning jet and to adjust it to the "connecting rod bearing center." The illustration in FIGS. 5a to 5b is greatly simplified; thus, the transmission members situated between the connecting rod 30 and the turning tool 14 have been omitted because it is only the fundamental kinematic relationship which is of concern. FIG. 5a shows the crank mechanism 28 in the left-hand outside dead center position of the connecting rod journal 47 thereof. In comparison therewith, the entire first crank mechanism 28 has moved further away from the crankshaft 1 in the horizontal direction at the same dead center position in FIG. 5b. This can be achieved if the entire first crank mechanism 28 is moved in the horizontal direction on the base part 31, which has to be made wider than illustrated in FIG. 3 in order to achieve this. Alternatively, the entire drive unit can be moved horizontally.

The modified setting shown in FIG. 5b offers the possibility of moving the turning tool 14 out of the way when the rotary driving and clamping device is being loaded and unloaded. Moreover, the adjustability shown in FIGS. 5a and 5b makes it possible to ensure that the effective radial extent of the turning tool 14 can be modified during face turning; adjustment must then be performed during face turning. The same effect can be achieved by automatically lengthening and shortening the connecting rod 30. However, this structural variant is very complex, and therefore horizontal adjustment of the entire crank mechanism 28 is generally preferred.

FIG. 5c shows the opposite dead center position to that in FIGS. 5a and 5b, while the illustration is otherwise the same. The double arrow 51 indicates the possibility of moving the connecting rod journal 47 radially on the eccentric disk 29. It is thereby possible to allow for different stroke lengths of the crankpin 4 on the crankshafts 1 to be machined by turning.

As a further variant, an alternating operating mode is possible, in which the movements of the eccentric disks 29 and 38 take place in oscillating fashion by a process in which they are turned alternately forward and backward. In this way, different travel distances can also be set by means of the controller alone, without the need for mechanical adjustments to be carried out.

The cutting depth to which the turning tool 14 penetrates laterally into the flat shoulder 9 of the crankpin 4 can likewise be adjusted by moving the main slide 24 on the horizontal running rails 23. To save time, however, a turning tool 14 which has major cutting edges on both sides will be used in many cases. In this case, the turning tool 14 again enters between two adjacent flat shoulders 9, wherein, according to the preferred embodiment illustrated, the two adjacent flat shoulders 9 are turned in a single turning operation.

Figure 6A:
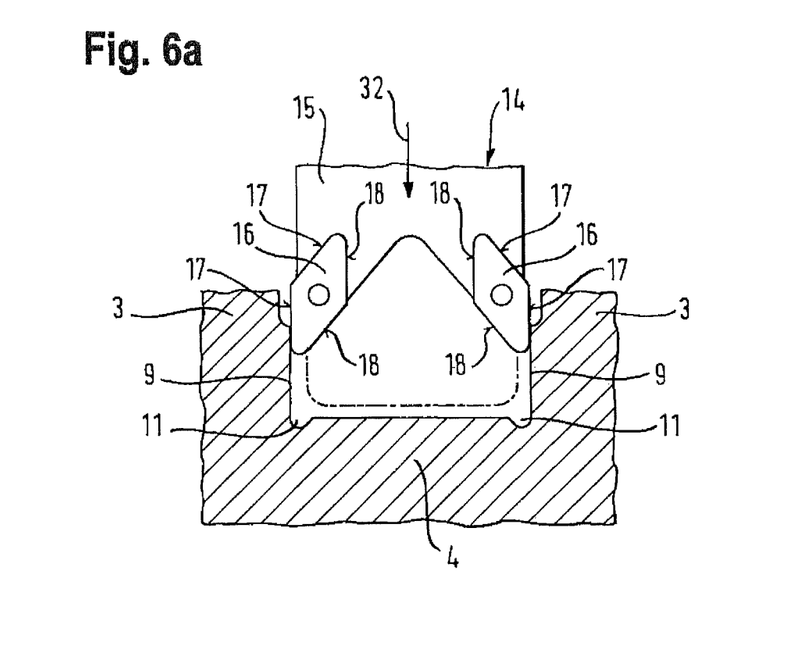
FIG. 6*a* is the illustration of a turning operation in a first working phase.
Figure 6B:
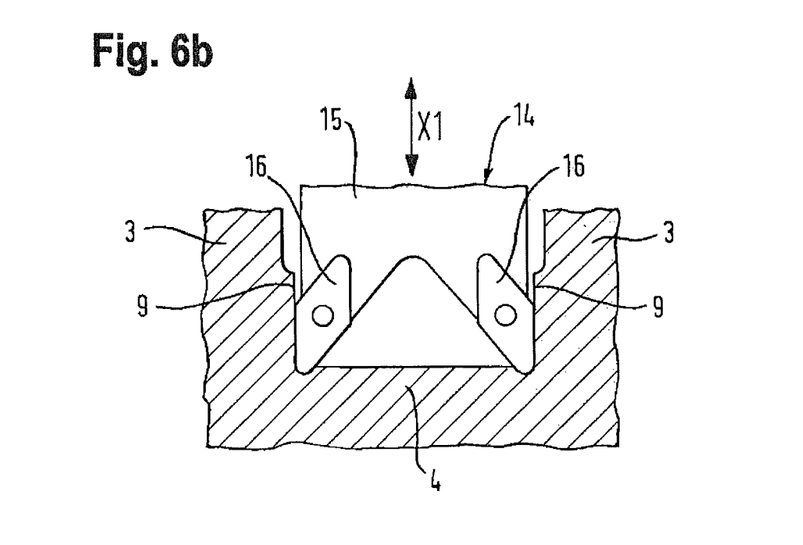
FIG. 6*b* shows the corresponding illustration in a second, further advanced working phase.

FIGS. 6a and 6b show another embodiment, in which the turning tool 14 has an insert carrier 15 having two indexable inserts 16. Each of these two indexable inserts 16 has two pairs of major cutting edges 17, 18, wherein, according to the illustration in FIGS. 6a and 6b, the lower pairs 17 and 18 are active in each case. As the turning tool 14 is fed in the horizontal direction 32, the flat shoulders 9 of the crankpin 4 are turned first of all by the outer major cutting edges 17, cf FIG. 6a. As the operation progresses to a greater penetration depth, the inward-facing lower major cutting edges 18 also come into effect, and the undercuts 11 are produced in a single operation, together with the grinding of the level flat shoulders 9, by the turning operation, cf FIG. 6b. This is an economic advantage which should not be underestimated.

Figure 7:
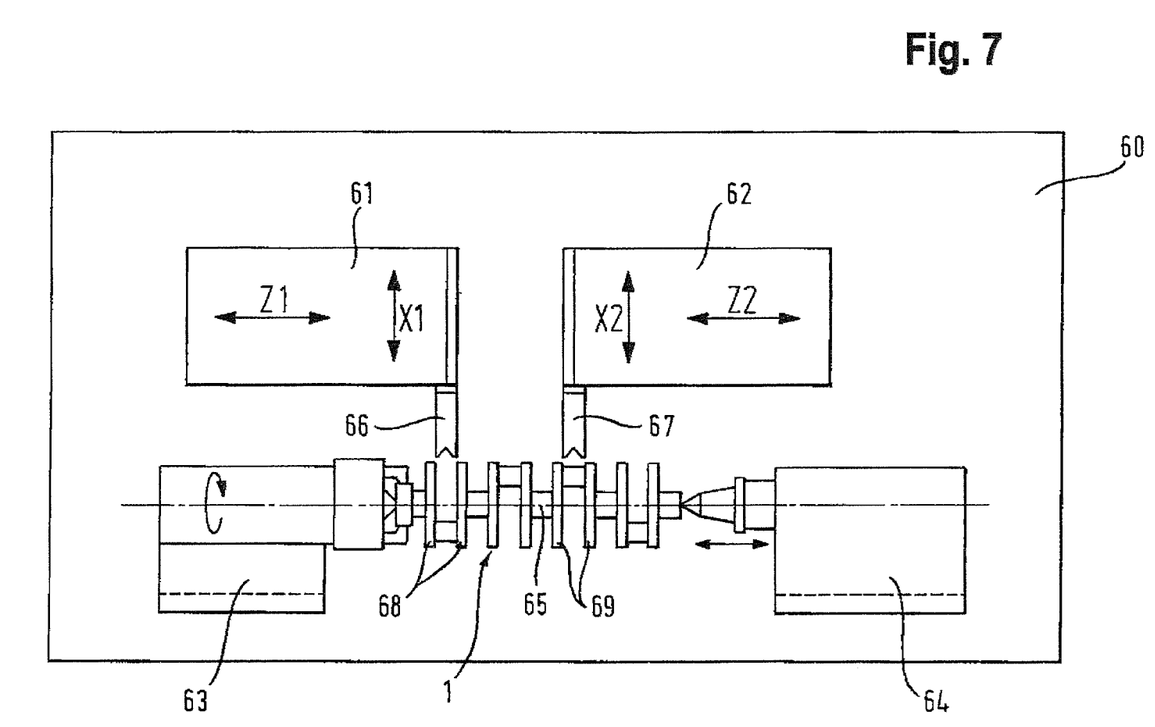
FIG. 7 illustrates how the grinding method can also be carried out with multiple engagement.

Economy can be further enhanced if multiple engagement of turning tools on several pairs of flat shoulders 9 of different crankpins 4 is carried out simultaneously when turning. This is made clear by FIG. 7. FIG. 7 shows a view from above of the machine bed 60 of a turning machine that is illustrated in principle. The rotary driving and clamping device already mentioned here consists of a workpiece headstock 63 and of a tailstock 64, which together fix a rotation and clamping axis 65. A first turning unit 61 having a first turning tool 66 and a second turning unit 62 having a second turning tool 67 are arranged adjacent to the rotary driving and clamping device. During operation, the rotary driving and clamping device remains fixed on the machine bed 16; only the clamped crankshaft 1 is driven to rotate.

In contrast, the first turning unit 61 and the second turning unit 62 are arranged so as to be movable on horizontal running rails and are constructed in the manner already described by means of a single turning unit with reference to FIG. 3. In the case of FIG. 7, each of the two turning units 61, 62 can be moved independently and, in operation, engages in a selected pair of webs 68, 69, each enclosing between them a different crankpin. The angular position of the crankpin bearings can be the same or phase-shifted. Since there are two turning units 61, 62, each of which can be used in an independently controlled manner, the embodiment shown in FIG. 7 can be used to turn the flat shoulders of crankpins which are at an identical or different positioning angle on the crankshaft 1. Simultaneous machining of in each case two flat shoulders of crankpins whose positioning angle on the crankshaft 1 coincides can be carried out with a single turning unit, although this must then have at least two turning tools 66, 67 on a single tool slide 35.

The invention claimed is:

1. A method for the complete machining at least of unmachined central bearing journals and crankpins and their respective flat shoulders surrounding the journals/pins on forged or cast blanks for a crankshaft, in which method
   a) first, machining the flat shoulders associated with the central bearing journals and the flat shoulders associated with the crankpins by turning, wherein the turning of the flat shoulders associated with the crankpins comprises:
      i) driving the crankshaft to rotate about its longitudinal axis, which extends horizontally and passes through the central bearing journals,
      ii) setting a major cutting edge of a turning tool laterally against at least one flat shoulder, the turning tool having three linear and mutually perpendicular directions of motion, of which the first direction of motion is horizontal and parallel to the longitudinal axis of the crankshaft, and
      iii) controlling the drives that bring about the three directions of motion, in a manner coordinated with the rotary motion of the crankshaft in such a way that the turning tool, which acts between the webs, is at the same level as the geometrical axis of the crankpin in any rotational position of the crankshaft;
   b) rough-grinding the central bearing journals without the flat shoulders thereof and the crankpins without the flat shoulders thereof and
   c) then, finish-grinding the central bearing journals and the crankpins from the oversize achieved by the rough grinding process to the final size.

2. The method as claimed in claim 1, wherein the flat shoulders associated with the central bearing journals are machined by turning before the flat shoulders associated with the crankpins.

3. The method as claimed in claim 1, the flat shoulders associated with the crankpins are machined by turning before the flat shoulders associated with the central bearing journals.

\* \* \* \* \*

UNITED STATES PATENT AND TRADEMARK OFFICE
CERTIFICATE OF CORRECTION

PATENT NO.      : 9,475,121 B2                                  Page 1 of 1
APPLICATION NO. : 14/366122
DATED           : October 25, 2016
INVENTOR(S)     : Erwin Junker It is certified that error appears in the above-identified patent and that said Letters Patent is hereby corrected as shown below:

On the Title Page

At item (73), Line 2, "Nordach" should be -- Nordrach --.

In the Claims

At Column 8, Line 64, "thereof and" should be -- thereof; and --.

Signed and Sealed this
Ninth Day of May, 2017

Michelle K. Lee
*Director of the United States Patent and Trademark Office*